Patented Aug. 10, 1937

2,089,444

UNITED STATES PATENT OFFICE 2,089,444

POLYMERIZED STYRENE

Hermann Staudinger, Freiburg, Breisgau, and Werner Heuer, Frankfort-on-the-Main-Hochst, Germany, assignors to I. G. Farbenindustrie Aktiengesellschaft, Frankfort - on - the - Main, Germany No Drawing. Application October 23, 1934, Serial No. 749,668. In Germany November 1, 1933

2 Claims. (Cl. 260—2)

The present invention relates to improvements in the preparation of polymerized styrene and to the new products obtained thereby.

It is known that styrene can be polymerized so as to form highly polymeric polymerization products which are composed of long chain molecules of the following constitution:

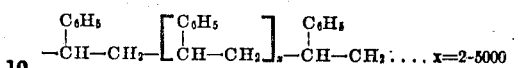

which for brevity's sake are called "fiber molecules" in the following. The degree of polymerization depends on the reaction conditions applied in such a manner that "hemicolloid" polystyrenes, i. e. products being composed of 50 to about 200 molecules of monomeric styrene are obtained by effecting the polymerization quickly, working in the heat or in the presence of polymerization catalysts, whereas very high molecular products being composed of about 1000 molecules of monomeric styrene are obtained if the polymerization is effected slowly and at moderate temperatures. The hemicolloid products are easily soluble in organic solvents and yield relatively low viscous solutions. At any rate, every polystyrene prepared according to the hitherto known methods is soluble in organic solvents regardless as to whether it has a hemicolloid or high molecular structure.

We have now found that high molecular products which are insoluble in organic solvents are obtained by effecting the polymerization of styrene in the presence of divinylbenzene. The object of our invention is, therefore, the conjoint polymerization of a mixture of styrene and divinylbenzene, so as to form highly polymeric products, which, contrary to the hitherto known polymerized styrene, are insoluble in organic solvents but at least capable of swelling therein. We wish it to be understood that the proportion of the styrene and divinylbenzene can be varied within wide limits, the capability of swelling of the polymerized products being the lower the higher the content of the divinylbenzene. For giving an example, styrene having a content of divinylbenzene of 0.1% or less yields easily swelling polymeric products which still contain traces of soluble polystyrene, whereas the capability of swelling of the product is decreased with an increase of the divinylbenzene content; thus, the product of the conjoint polymerization of 90 parts of styrene and 10 parts of divinylbenzene is practically insoluble and not capable of swelling in organic solvents.

We wish to point out that our present invention is not restricted to the heat polymerization process, any known method or auxiliary agent which serves the purpose in question being operative in our new process. As example there may be mentioned the emulsion polymerization, use of accelerators, such as benzoyl superoxide, irradiation and so on.

The decrease of solubility and of the capability of swelling of the new products is probable due to the fact that the "fiber molecules" are linked together, so as to form three-dimensioned molecules as is more fully illustrated by the following formulae:—

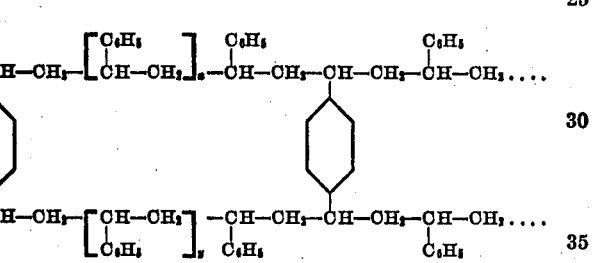

The following examples illustrate the invention, without limiting it thereto, the parts being by weight:—

Example 1

A mixture of 500 parts of styrene and 1 part of divinylbenzene is subjected to polymerization by heating the same to 100° C. for about 10 days. A glasslike polymerized product is obtained which is insoluble in benzene but capable of swelling therein. Exceedingly small traces of soluble products can be extracted therefrom by means of benzene.

Example 2

1 part of divinylbenzene is mixed with 500 parts of styrene and 1 part of benzoylsuperoxide is added thereto. The mixture thus obtained is emulsified in water with the addition of 10 grams of sodium oleate. The whole is then heated to about 100° C. for 1 to 2 hours. The qualities of the products are similar to those of the product described in Example 1.

Example 3

1 part of divinylbenzene is heated with 50 parts of styrene to 100° C. for about 10 days. The polymerization product thus obtained shows a much lower capability of swelling than the products obtained according to the Examples 1 and 2.

Example 4

10 parts of divinylbenzene are mixed with 90 parts of styrene with the addition of 0.5 part of benzoylsuperoxide. The mixture thus obtained is emulsified in water with the addition of 2 grams of ammonium oleate. The whole is then heated to about 100° C. for several hours. The product thus obtained is insoluble in organic solvents and scarcely capable of swelling therein.

Example 5

Ethyl benzene prepared from benzene and ethylene by means of aluminium chloride contains small traces of diethylbenzene, which can only be removed therefrom by carefully fractionating the same. The ethylbenzene thus obtained which still contains diethylbenzene yields upon dehydrogenating a mixture of styrene and divinylbenzene, which can be polymerized so as to form a polystyrene, which is insoluble in organic solvents, but capable of swelling therein.

Example 6

100 parts of styrene with a divinylbenzene content of about 0.05% are heated to 100° C. for about 10 days. The polymerization product thus obtained is insoluble in organic solvents but is capable of swelling therein so as to assume its tenfold form.

We claim:—

1. The process which comprises polymerizing styrene having admixed thereto about 0.05 to about 10% of its weight of divinylbenzene.

2. The products of the conjoint polymerization of a mixture of styrene and divinylbenzene, the latter being present in an amount between about 0.05 and about 10% of the weight of the styrene.

HERMANN STAUDINGER.
WERNER HEUER.